US011066959B2

(12) United States Patent
Swift

(10) Patent No.: US 11,066,959 B2
(45) Date of Patent: Jul. 20, 2021

(54) GEARED TURBOFAN GAS TURBINE ENGINE MOUNTING ARRANGEMENT

(71) Applicant: ROLLS-ROYCE plc, London (GB)

(72) Inventor: Andrew Swift, Uttoxeter (GB)

(73) Assignee: ROLLS-ROYCE plc, London (GB)

( * ) Notice: Subject to any disclaimer, the term of this patent is extended or adjusted under 35 U.S.C. 154(b) by 83 days.

(21) Appl. No.: 16/453,100

(22) Filed: Jun. 26, 2019

(65) Prior Publication Data
US 2020/0032674 A1    Jan. 30, 2020

(30) Foreign Application Priority Data

Jul. 10, 2018   (GB) ...................................... 1811281

(51) Int. Cl.
*F01D 25/28* (2006.01)
*B64D 27/12* (2006.01)
(Continued)

(52) U.S. Cl.
CPC ............. *F01D 25/28* (2013.01); *B64D 27/12* (2013.01); *B64D 29/02* (2013.01); *B64D 29/06* (2013.01);
(Continued)

(58) Field of Classification Search
CPC .. F01D 25/28; F01D 25/24; F02C 7/20; F02C 7/36; B64D 27/12; B64D 29/02;
(Continued)

(56) References Cited

U.S. PATENT DOCUMENTS 5,524,847 A * 6/1996 Brodell ..................... B64C 7/02
244/54
6,474,597 B1 * 11/2002 Cazenave .............. B64D 27/18
244/54
(Continued)

FOREIGN PATENT DOCUMENTS

GB          2 1190857 A       11/1983
WO        2014/197080 A2     12/2014
WO       WO-2014197033 A2 *  12/2014  ............... F02K 1/70

OTHER PUBLICATIONS

Nov. 13, 2019 Extended European Search Report issued in European Patent Application No. 19182240.2.

*Primary Examiner* — Justin D Seabe
*Assistant Examiner* — Ryan C Clark
(74) *Attorney, Agent, or Firm* — Oliff PLC

(57) ABSTRACT

An aircraft gas turbine engine includes an engine core including a turbine, a compressor, a core shaft connecting the turbine to compressor, and a core casing surrounding the engine core. A fan is located upstream of the engine core and fan casing surrounds the fan. A gearbox receives input from the core shaft and outputs drive to rotate the fan. A single plane support structure connects the core and fan casing. The support structure includes an inner ring, outer ring and plurality of circumferentially spaced radially extending struts connecting the inner and outer ring. The inner ring including a torsion box and a gearbox and fan support structure is connected to the torsion box. A front and rear mount are configured to connect the gas turbine engine to the aircraft, wherein the front mount is coupled to the torque box and the rear mount is coupled to the core casing.

15 Claims, 3 Drawing Sheets

(51) Int. Cl.
    *B64D 29/02*     (2006.01)
    *B64D 29/06*     (2006.01)
    *F01D 25/24*     (2006.01)
    *F02C 7/36*     (2006.01)
    *B64D 33/02*     (2006.01)
    *B64D 33/04*     (2006.01)

(52) U.S. Cl.
    CPC ................ *F01D 25/24* (2013.01); *F02C 7/36* (2013.01); *B64D 33/02* (2013.01); *B64D 33/04* (2013.01); *F05D 2220/323* (2013.01)

(58) Field of Classification Search
    CPC ........ B64D 29/06; B64D 33/02; B64D 33/04; F05D 2220/323; F05D 2260/40311
    See application file for complete search history.

(56) References Cited

U.S. PATENT DOCUMENTS

| | | | |
|---|---|---|---|
| 8,444,084 B2 * | 5/2013 | Udall | B64D 27/20 244/54 |
| 9,090,353 B2 * | 7/2015 | Waldron | F02C 7/20 |
| 9,416,734 B2 | 8/2016 | Thies et al. | |
| 9,976,443 B2 * | 5/2018 | Coffin | B64D 29/06 |
| 2009/0056343 A1 | 3/2009 | Suciu et al. | |
| 2012/0291449 A1 * | 11/2012 | Adams | F01D 9/041 60/793 |
| 2015/0377123 A1 | 12/2015 | Adams et al. | |
| 2018/0016939 A1 | 1/2018 | Klaus | |

\* cited by examiner

GEARED TURBOFAN GAS TURBINE ENGINE MOUNTING ARRANGEMENT

CROSS-REFERENCE TO RELATED APPLICATIONS

This specification is based upon and claims the benefit of priority from United Kingdom patent application number GB 1811281.3 filed on Jul. 10, 2018, the entire contents of which are incorporated herein by reference.

BACKGROUND

Field of the Disclosure

The present disclosure relates to a geared turbofan gas turbine engine mounting arrangement.

Description of the Related Art

Currently geared turbofan gas turbine engines produce less than 40,000 lbf thrust, 180 kN thrust. There is a requirement for geared turbofan gas turbine engine which produce more than 40,000 lbf thrust, 180 kN thrust. A geared turbofan gas turbine engine which produces more than 40,000 lbf thrust, 180 kN thrust, comprises a large diameter low pressure ratio, low specific thrust, fan, a large diameter fan casing around the fan, a high pressure and high temperature small diameter engine core and a gearbox to drive the fan.

Conventional large diameter turbofan gas turbine engines have a mounting arrangement comprising a front mount on the fan casing and a rear mount on the core casing, e.g. in the vicinity of the low pressure turbine outlet guide vane structure. Conventional large diameter turbofan gas turbine engines have A-frame structures connecting the core casing and the fan casing to further support the engine core from the fan casing, but the A-frame structures reduce the performance and efficiency of a turbofan gas turbine engine and would reduce the performance and efficiency of a geared turbofan gas turbine engine.

If a geared turbofan gas turbine engine comprising a large diameter low pressure ratio, low specific thrust, fan, a large diameter fan casing around the fan, a high pressure and high temperature small diameter engine core and a gearbox to drive the fan had a front mount on the fan casing it would result in increased swing moment during a side gust, or a manoeuvre of the aircraft, which in turn would lead to high swing movement of the geared gas turbine engine and high torque reaction loads in the rear mount low pressure turbine outlet guide vane structure.

SUMMARY

Accordingly the present disclosure seeks to provide a geared turbofan gas turbine engine mounting arrangement which reduces, or overcomes, the above mentioned problem.

According to a first aspect there is provided a gas turbine engine for an aircraft comprising:
  an engine core comprising a turbine, a compressor, a core shaft connecting the turbine to the compressor, and a core casing surrounding the engine core,
  a fan located upstream of the engine core, the fan comprising a plurality of fan blades and a fan casing surrounding the fan,
  a gearbox that receives an input from the core shaft and outputs drive to the fan so as to drive the fan at a lower rotational speed than the core shaft, the gearbox being located between the fan and the engine core,
  a single plane support structure connecting the core casing and the fan casing, the single plane support structure comprising an inner ring, an outer ring and a plurality of circumferentially spaced radially extending struts connecting the inner ring and the outer ring, the inner ring comprising a torsion box,
  a gearbox and fan support structure connected to the torsion box,
  and a front mount and a rear mount, the front and rear mounts being configured to connect the gas turbine engine to the aircraft,
  wherein the front mount is coupled to the torque box and the rear mount is coupled to the core casing.

The struts may be fan outlet guide vanes, e.g. the struts may be aerodynamically shaped.

A single plane support structure means that there are no vanes, e.g. there isn't a vane structure, upstream of the single plane support between the fan casing, or other structure connected to the fan casing, and the core casing and there are no vanes, e.g. there isn't a vane structure, downstream of the single plane support structure between the fan casing, or other structure connected to the fan casing, and the core casing.

The torque box may be rectangular in cross-section in a plane containing the axis of the engine.

The torque box may comprise an outer wall having an upstream end and a downstream end, the outer wall being connected to the struts, an inner wall having an upstream end and a downstream end, an upstream wall and a downstream wall, the upstream wall connecting the upstream ends of the inner wall and the outer wall and the downstream wall connecting the downstream ends of the inner wall and the outer wall.

The torque box may be triangular in cross-section in a plane containing the axis of the engine.

The torque box may comprise an outer wall having an upstream end and a downstream end, the outer wall being connected to the struts, an inner wall having an upstream end and a downstream end and a downstream wall, the upstream ends of the inner wall and the outer wall being connected and the downstream wall connecting the downstream ends of the inner wall and the outer wall.

The inner wall may be defined by a portion of the core casing.

The outer wall may be defined by a portion of a core nacelle.

The front mount may be coupled to the downstream wall of the torque box.

The front mount may be located at substantially the same axial position as a centre of gravity of the gas turbine engine or forward of the centre of gravity of the gas turbine engine.

The single plane support structure may be located at substantially the same axial position as a centre of gravity of the gas turbine engine or forward of the centre of gravity of the gas turbine engine.

The rear mount may be connected to the turbine outlet guide vanes of the turbine.

The gearbox and fan support structure may comprise an engine core inlet stator vane structure.

A thrust reverser may be secured to and cantilevered from the downstream end of the fan casing.

The turbine may be a first turbine, the compressor is a first compressor, and the core shaft is a first core shaft; the engine core further comprises a second turbine, a second compressor, and a second core shaft connecting the second turbine to the second compressor; and the second turbine, the second compressor, and the second core shaft are arranged to rotate at a higher rotational speed than the first core shaft.

An inter compressor stator vane structure may be located between the first compressor and the second compressor and the inter compressor vane structure is connected to the core casing.

The torque box may be located upstream of the inter compressor vane structure.

The front mount may be provided in the same axial region as the first compressor.

The front mount may be provided at a rear end of the first compressor.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
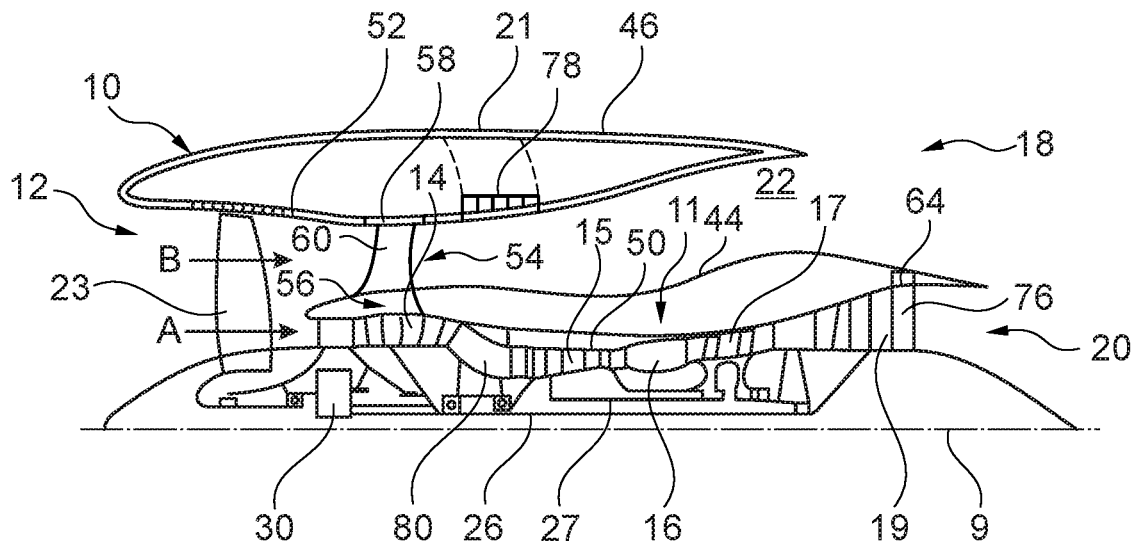
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a engine core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines the air intake 12, a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
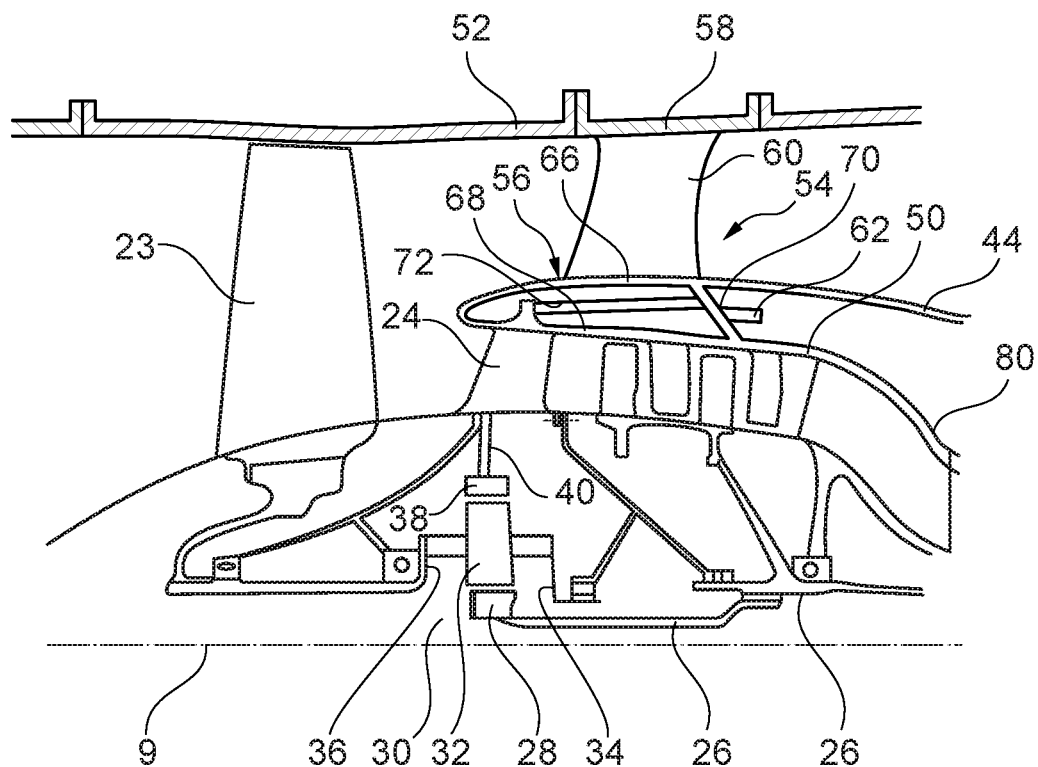
FIG. 2 is a close up sectional side view of an upstream portion of a gas turbine engine shown in FIG. 1.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
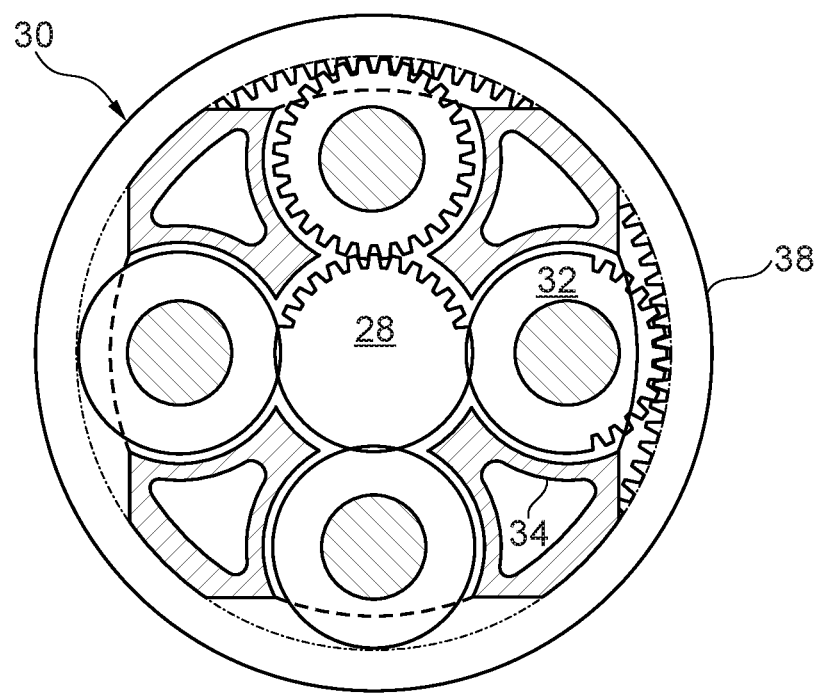
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The geared gas turbine engine 10 comprises a single plane support structure 54 which connects the core casing 50 and the fan casing 52, as shown in FIGS. 1 and 2. The single plane support structure 54 comprises an inner ring 56, an outer ring 58 and a plurality of circumferentially spaced radially extending struts 60 connecting the inner ring 56 and the outer ring 58. The inner ring 56 comprises a torsion box. A gearbox and fan support structure, e.g. the stationary support structure, 24 is connected to the torsion box, e.g. the inner ring 56 of the single plane support structure 54. The gearbox and fan support structure, e.g. the stationary support structure, 24 comprises an engine core 11 inlet stator vane structure. The geared gas turbine engine 10 comprises a front mount 62 and a rear mount 64 and the front mount 62 and the rear mount 64 are configured to connect the geared gas turbine engine 10 to an aircraft. The front mount 62 and the rear mount 64 may be configured to connect the geared gas turbine engine to a wing of the aircraft, e.g. to a pylon on a wing of an aircraft. The front mount 62 is coupled to the torque box, e.g. to the inner ring 56 of the single plane support structure 54 and the rear mount 64 is coupled to the core casing 50. The rear mount 64 is coupled to the turbine outlet guide vanes 76 of the low pressure turbine 19. The struts 60 are loaded carrying structures and may be aerodynamically shaped to form fan outlet guide vanes.

A single plane support structure 54 is a support structure in which there are no vanes, e.g. there isn't a vane structure, upstream of the single plane support structure 54 between the fan casing 52, or other structure connected to the fan casing 52, and the core casing 50 and there are no vanes, e.g. there isn't a vane structure, downstream of the single plane support structure 54 between the fan casing 52, or other structure connected to the fan casing 52, and the core casing 50. The torque box is triangular in cross-section in a plane containing the axis 9 of the engine 10, as shown in FIG. 2. The torque box comprises an outer wall 66 having an upstream end and a downstream end and the outer wall 66 is connected to the struts 60. The torque box comprises an inner wall 68 having an upstream end and a downstream end and a downstream wall 70. The upstream ends of the inner wall 68 and the outer wall 66 are connected and the downstream wall 70 connects the downstream ends of the inner wall 68 and the outer wall 66. In this example the inner wall 68 is defined by a portion of the core casing 50. In this example the outer wall 66 is defined by a portion of a core nacelle 44. The core nacelle 44 surrounds the core casing 50 and defines the radially inner surface of the bypass duct 22. The core nacelle 44 is generally shaped to provide an aerodynamic surface for the bypass duct 22. The front mount 62 is coupled to the downstream wall 70 of the torque box. The torque box may also comprise an intermediate wall 72 having an upstream end and a downstream end. The upstream end of the intermediate wall 72 is connected to the inner wall 68 and the downstream end is connected to the downstream wall 70. The intermediate wall 72 further stiffens the torque box.

Figure 4:
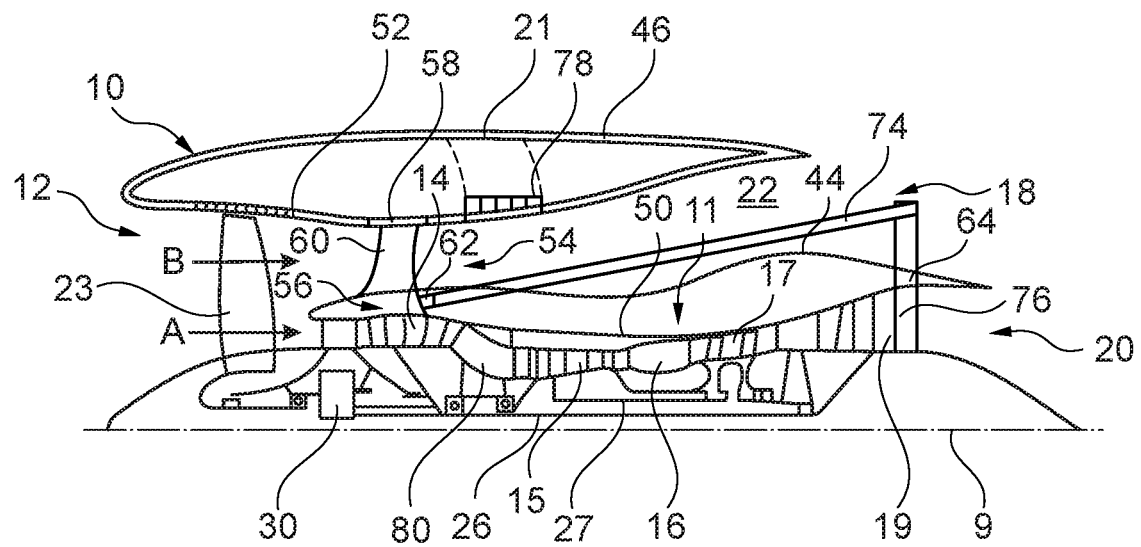
FIG. 4 is a sectional side view of a gas turbine engine illustrating the mounting arrangement to an aircraft.

FIG. 4 shows the geared gas turbine engine 10 mounted onto an aircraft structure 74. The aircraft structure 74 comprises a portion of the pylon and the aircraft structure 74 is connected to the front mount 62 on the torque box and is connected to the rear mount 64 on the turbine outlet guide vanes 76 of the low pressure turbine 19. The aircraft structure 74 comprises a portion of the pylon and the aircraft structure 74 is connected to the front mount 62 on the downstream wall 70 of the torque box and is connected to the rear mount 64 on the turbine outlet guide vanes 76 of the low pressure turbine 19. The rear mount 64 may be connected to two circumferentially spaced regions of the turbine outlet guide vanes 76.

An inter compressor stator vane structure 80 is located between the intermediate pressure compressor 14 and the high pressure compressor 15 and the inter compressor vane structure 80 is connected to the core casing 50. The torque box is located upstream of the inter compressor vane structure 80. The front mount 62 is provided in the same axial region as the intermediate pressure compressor 14. The front mount 62 is provided at a rear end of the intermediate pressure compressor 14.

The front mount 62 may be located at substantially the same axial position as a centre of gravity of the gas turbine engine 10 or forward of the centre of gravity of the gas turbine engine 10. The single plane support structure 54 may be located at substantially the same axial position as a centre of gravity of the gas turbine engine 10 or forward of the centre of gravity of the gas turbine engine 10.

A thrust reverser 78 is secured to and cantilevered from the downstream end of the fan casing 52 or the thrust reverser 78 is secured to and cantilevered from the downstream end of the single plane support structure 54, e.g. the thrust reverser 78 is secured to and cantilevered from the downstream end of the outer ring 58 of the single plane support structure 54.

Figure 5:
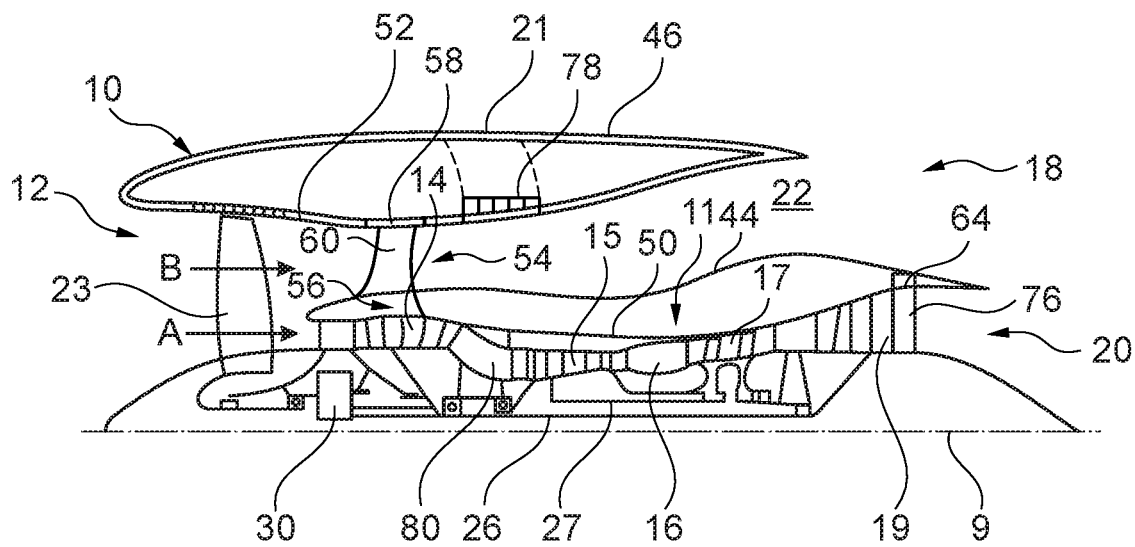
FIG. 5 is a sectional side view of an alternative gas turbine engine.
Figure 6:
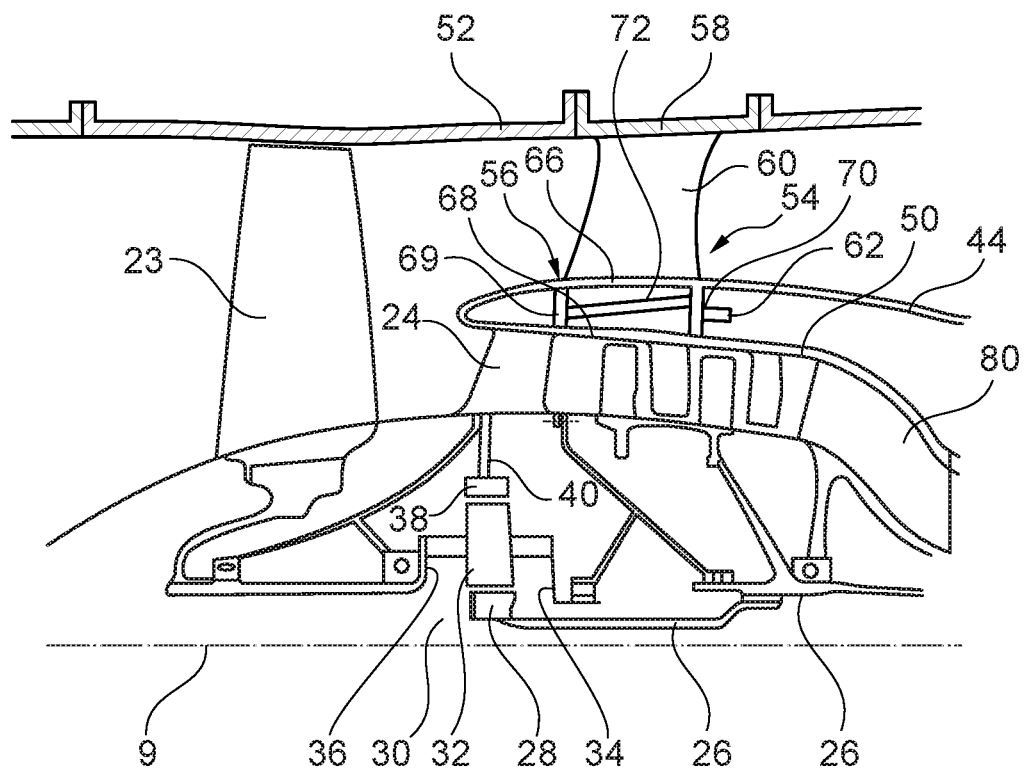
FIG. 6 is a close up sectional side view of an upstream portion of a gas turbine engine shown in FIG. 5.

FIGS. 5 and 6 illustrate a gas turbine engine 10 having a torque box which is rectangular in cross-section in a plane containing the axis of the engine. The arrangement in FIGS. 5 and 6 is similar to that shown in FIGS. 1 and 2 and like parts are denoted by like numerals. The torque box comprises an outer wall 66 having an upstream end and a downstream end, the outer wall 66 being connected to the struts 60, an inner wall 68 having an upstream end and a downstream end, an upstream wall 69 and a downstream wall 70, the upstream wall 69 connecting the upstream ends of the inner wall 68 and the outer wall 66 and the downstream wall 70 connecting the downstream ends of the inner wall 68 and the outer wall 66. The inner wall 68 may defined by a portion of the core casing 50. The outer wall 66 may be defined by a portion of a core nacelle 44. The front mount 62 is coupled to the downstream wall 70 of the torque box. The torque box may also comprise an intermediate wall 72 having an upstream end and a downstream end. The upstream end of the intermediate wall 72 is connected to the upstream wall 69 and the downstream end is connected to the downstream wall 70. The intermediate wall 72 further stiffens the torque box.

The front mount 62 in this arrangement may also be located at substantially the same axial position as a centre of gravity of the gas turbine engine 10 or forward of the centre of gravity of the gas turbine engine 10. The single plane support structure 54 may be located at substantially the same axial position as a centre of gravity of the gas turbine engine 10 or forward of the centre of gravity of the gas turbine engine 10.

The present disclosure provides a front mount on the core casing which decreases the swing moment and hence the swing movement, reduces tail bearing housing torque and reduces the weight of the geared turbofan gas turbine engine. The present disclosure mounts the thrust reverser directly on/at the rear of the fan casing reducing the weight of the geared gas turbine engine. The present disclosure provides a single plane support structure between the core casing and the fan casing in which the struts of the single plane support structure transmit their own loads and the loads from the fan casing and the loads from other structures connected to the fan casing, e.g. aerodynamic and inertia loads from the intake structure, the thrust reverser and the nacelle, to the core casing and the front and rear mounts to increase the aerodynamic performance of the geared gas turbine engine. The single plane support structure comprises the torsion box and the struts.

The present disclosure provides a large thrust geared turbofan gas turbine engine with a large diameter low pressure ratio low specific thrust fan and large diameter nacelle, combined with a high pressure and high temperature small diameter engine core and a fan drive power gearbox and a single plane support structure, comprising struts, or fan outlet guide vanes, and a torsion box and an engine core front mount connected to the torsion box. A thrust reverser may be attached directly to the rear of the fan casing.

Although the present disclosure has referred to a geared turbofan gas turbine engine which produces more than 40,000 lbf thrust, 180 kN thrust, it is equally applicable to a geared turbofan gas turbine engine which produces less than 40,000 lbf thrust, 180 kN thrust.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A gas turbine engine for an aircraft comprising:
   an engine core comprising a turbine, a compressor, a core shaft connecting the turbine to the compressor, and a core casing surrounding the engine core,
   a fan located upstream of the engine core, the fan comprising a plurality of fan blades and a fan casing surrounding the fan,
   a gearbox that receives an input from the core shaft and outputs drive to the fan so as to drive the fan at a lower rotational speed than the core shaft, the gearbox being located between the fan and the engine core,
   a single plane support structure connecting the core casing and the fan casing, the single plane support structure comprising an inner ring, an outer ring and a plurality of circumferentially spaced radially extending struts connecting the inner ring and the outer ring, the inner ring comprising a torque box,
   a gearbox and fan support structure connected to the torque box,
   and a front mount and a rear mount, the front and rear mounts being configured to connect the gas turbine engine to the aircraft,
   wherein the front mount is coupled to the torque box and the rear mount is coupled to the core casing,
   wherein the torque box comprises an outer wall having an upstream end and a downstream end, the outer wall being connected to the struts, an inner wall having an upstream end and a downstream end, an upstream wall and a downstream wall, the upstream wall connecting the upstream ends of the inner wall and the outer wall and the downstream wall connecting the downstream ends of the inner wall and the outer wall,
   wherein the upstream wall and the downstream wall are parallel to each other, and
   wherein the front mount is directly coupled to the downstream wall of the torque box.

2. A gas turbine engine as claimed in claim 1, wherein the struts are fan outlet guide vanes.

3. A gas turbine engine for an aircraft comprising: an engine core comprising a turbine, a compressor, a core shaft connecting the turbine to the compressor, and a core casing surrounding the engine core,
   a fan located upstream of the engine core, the fan comprising a plurality of fan blades and a fan casing surrounding the fan, a gearbox that receives an input from the core shaft and outputs drive to the fan so as to drive the fan at a lower rotational speed than the core shaft, the gearbox being located between the fan and the engine core, a single plane support structure connecting the core casing and the fan casing, the single plane support structure comprising an inner ring, an outer ring and a plurality of circumferentially spaced radially extending struts connecting the inner ring and the outer ring, the inner ring comprising a torque box, a gearbox and fan support structure connected to the torque box, and a front mount and a rear mount, the front and rear mounts being configured to connect the gas turbine engine to the aircraft, wherein the front mount is coupled to the torque box and the rear mount is coupled to the core casing, wherein the torque box comprises an outer wall having an upstream end and a downstream end, the outer wall being connected to the struts, an inner wall having an upstream end and a downstream end and a downstream wall, the upstream ends of the inner wall and the outer wall being connected and the downstream wall connecting the downstream ends of the inner wall and the outer wall, wherein an angle formed at an intersection of the downstream wall and the inner wall is acute, and wherein the front mount is directly coupled to the downstream wall of the torque box.

4. A gas turbine engine as claimed in claim 1, wherein the inner wall is defined by a portion of the core casing.

5. A gas turbine engine as claimed in claim 3, wherein the outer wall is defined by a portion of a core nacelle.

6. A gas turbine engine as claimed in claim 1, wherein the front mount is located at substantially the same axial position as a centre of gravity of the gas turbine engine or forward of the center of gravity of the gas turbine engine.

7. A gas turbine engine as claimed in claim 1, wherein the single plane support structure is located at substantially the same axial position as a center of gravity of the gas turbine engine or forward of the centre of gravity of the gas turbine engine.

8. A gas turbine engine as claimed in claim 1, wherein the rear mount is connected to the turbine outlet guide vanes of the turbine.

9. A gas turbine engine as claimed in claim 1, wherein the gearbox and fan support structure comprises an engine core inlet stator vane structure.

10. A gas turbine engine as claimed in claim 1, wherein a thrust reverser is secured to and cantilevered from the downstream end of the fan casing.

11. A gas turbine engine as claimed in claim 1, wherein the turbine is a first turbine, the compressor is a first compressor, and the core shaft is a first core shaft; the engine core further comprises a second turbine, a second compressor, and a second core shaft connecting the second turbine to the second compressor; and the second turbine, the second compressor, and the second core shaft are arranged to rotate at a higher rotational speed than the first core shaft.

12. A gas turbine engine as claimed in claim 11, wherein an inter compressor stator vane structure is located between the first compressor and the second compressor and the inter compressor vane structure is connected to the core casing.

13. A gas turbine engine as claimed in claim 12, wherein the torque box is located upstream of the inter compressor vane structure.

14. A gas turbine engine as claimed in claim 11, wherein the front mount is provided in the same axial region as the first compressor.

15. A gas turbine engine as claimed in claim 11, wherein the front mount is provided at a rear end of the first compressor.

* * * * *